March 21, 1967  J. C. DYGERT ET AL  3,310,617
PROCESS FOR PREPARING UNIFORM MELT DISPERSION OF BLOWING AGENT
AND POLYMER AND ITS USE IN MAKING FOAMED PRODUCTS
Filed June 19, 1963
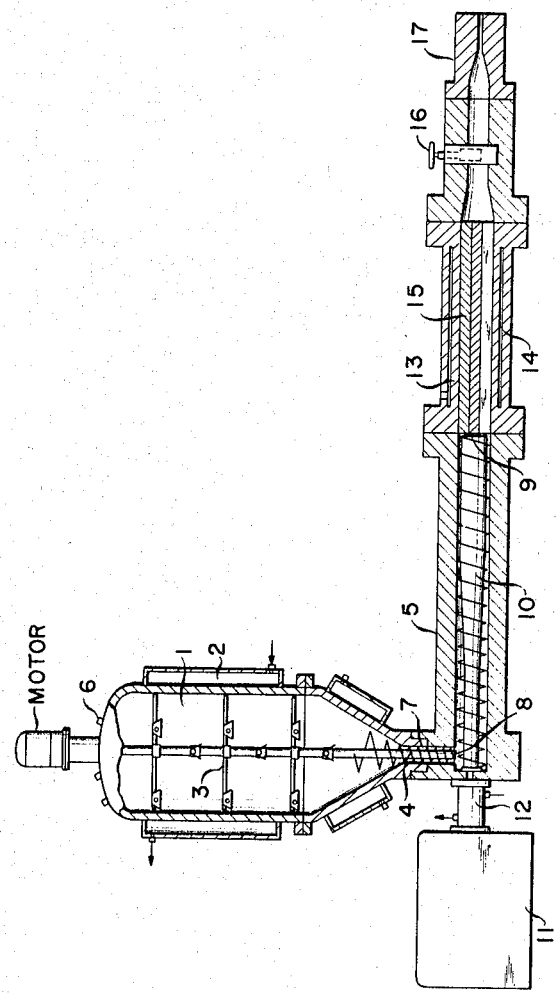
INVENTORS:
JUSTIN C. DYGERT
ARTHUR L. FRICKE
BY:
THEIR AGENT

3,310,617
PROCESS FOR PREPARING UNIFORM MELT DISPERSION OF BLOWING AGENT AND POLYMER AND ITS USE IN MAKING FOAMED PRODUCTS
Justin C. Dygert, Walnut Creek, and Arthur L. Fricke, San Lorenzo, Calif., assignors to Shell Oil Company, New York, N.Y., a corporation of Delaware
Filed June 19, 1963, Ser. No. 289,114
13 Claims. (Cl. 264—53)

This invention relates to a process for preparing melt dispersions of blowing agent and polymeric material and to the use of the dispersions in making foamed products. More particularly, the invention relates to a new technique for preparing a melt dispersion of uniform composition, to the use of such melt dispersions in the preparation of cellular products of improved properties, and to the apparatus for accomplishing the same.

Specifically, the invention provides a new and highly efficient process for preparing melt dispersions of thermoplastic polymeric material and preferably polymers of alpha-olefins, such as polypropylene, and a volatile liquid blowing agent, such as isopentane, which melt dispersions have a uniform composition and can be used to form cellular products having controlled cell size and uniform cell size distribution with a resulting improvement in physical properties, such as toughness and flexibility. This process comprises mixing solid finely divided particles of the thermoplastic polymer with the volatile blowing agent under such conditions that there is intimate and uniform contact of particles and blowing agent, applying pressure and increasing the temperature so as to melt the polymer particles while maintaining the blowing agent in intimate contact with the thermoplastic material.

The invention further provides a process for utilizing the above-described uniform melt dispersions in preparing superior foamed products of controlled cell size and uniform cell size distribution which comprises cooling the uniform melt obtained by the above-described process to a temperature just above the crystallization point of the thermoplastic polymer and maintaining the pressure sufficient to prevent volatilization of the blowing agent, and then extruding the melt and effecting formation of the foamed product by release of the pressure, such as by extruding through an orifice open to the atmosphere.

It is known that foamed products can be obtained from thermoplastic materials, such as polystyrene, by mixing the thermoplastic polymers with a volatile blowing agent and then treating the resulting mixture so as to allow the blowing agent to expand and form the cellular product. Various techniques have been suggested for use in effecting the mixing of the polymer with the blowing agent. One procedure is to immerse the polymer particles in the desired volatile blowing agent, permit the agent to swell the polymer, remove the excess liquid from the particles and then place the treated particles in the desired mold and heat to volatilize the solvent. While this process finds some success with amorphous polymers, such as polystyrene, wherein the blowing agent has good solubility in the polymer, it is not satisfactory for use with crystalline polymers, such as isotactic polypropylenes, which have poor solubility characteristics below the recrystallization temperature.

It has also been suggested that the mixing be accomplished by melting the polymer and adding the blowing agent, and shearing the mixture under pressure to obtain the desired dispersion. This mixture is then foamed by extruding from a higher to lower pressure. This system, however, is also ineffective with polymers such as polypropylene, because it is very difficult to obtain the desired degree of dispersion of the blowing agent in the polymer without excessive degradation caused by excessive shearing of the polymer. As a result, the foams are non-uniform and are of rather large cell size. These defects in turn affect the physical properties of the cellular material, such as toughness and flexibility.

It is an object of the invention, therefore, to provide a new process for preparing melt dispersions of polymeric materials which may be used to form cellular products. It is a further object to provide a new process for preparing melt dispersions of crystalline polymeric materials wherein the blowing agent has limited solubility in the polymers at temperatures lower than their recrystallization point. It is a further object to provide a new process for preparing melt dispersions of relatively low viscosity liquid in thermoplastic polymers. It is a further object to provide a process for obtaining a high degree of mixing of blowing agent and polymer without excessive shearing of the polymer. It is a further object to provide a process for making uniform melt solutions which can be expanded by release of pressure to form uniform individual closed cell foamed materials. It is a further object to provide uniform melt dispersions of polymers, such as polypropylene, which can be used to form cellular products having improved properties. It is a further object to provide a new process for preparing non-collapsing cellular thermoplastic polymeric products having uniform small cells. It is also an object to provide a process for making foamed products having controlled cell size, e.g., either small or large cells, wherein there is a small range of size distribution within the desired size. It is a further object to provide a new process for preparing cellular polymeric products having improved toughness and flexibility. It is a further object to provide a new process for preparing polypropylene cellular products having superior properties. These and other objects of the invention will be apparent from the following detailed description thereof and the attached drawing illustrating a typical apparatus that might be used to make the improved foamed products.

It has now been discovered that these and other objects may be accomplished in part by the process of the invention comprising mixing solid finely-divided particles of the thermoplastic polymer with a volatile blowing agent under such conditions that there is intimate and uniform contact of particles, applying pressure and increasing the temperature so as to melt the polymer articles while maintaining the blowing agent in intimate contact with the thermoplastic material. Cellular products can then be formed from this melt by cooling the uniform melt to a temperature just above the crystallization point of the thermoplastic polymer and maintaining the pressure sufficient to keep the blowing agent and polymer in intimate contact, and then extruding the melt and effecting formation of the foamed product by release of the pressure, such as by extruding through an orifice open to atmospheric pressure. It has been unexpectedly found that the melt dispersion formed by the above process has surprising homogeneity, and when used to form cellular products by the above-noted technique, one obtains foams of greatly improved properties. Thus, foamed products prepared by this process have controlled cell size, e.g., small or large, wherein there is a small range of size distribution within the desired size. As a result the resulting cellular products display greatly improved properties, such as toughness and flexibility, and the properties can be varied as desired by proper control of the foaming process.

The material used in making the uniform melt dispersions of the present invention comprise the thermoplastic polymeric materials which are obtainable as solid particles. By "thermoplastic" is meant those polymers which melt when heated, say to temperature above 200° F. A great variety of different materials are included in this group, such as, for example, polymers of ethylenically unsaturated monomers, certain alkyd type resins, i.e., reaction products of polybasic acids and polyhydric alcohols, certain polyurethanes, certain polycarbonates, cellulose derivatives, certain phenolic resins and the like.

Particularly preferred materials to be utilized comprise the polymers of the ethylenically unsaturated monomers. This includes the homopolymers, copolymers, terpolymers, graft copolymers and block copolymers as well as blends and mixtures of two or more polymeric materials as well as blends of the polymers with other materials such as wax. This includes, among other, polymers and copolymers of monomers such as ethylene, propylene, butylene, isobutylene, octene, styrene, alpha-methylstyrene, dichlorostyrene, vinyl naphthalene, vinyl phenol, acrylic acid, methyl methacrylate, ethyl acrylate, butyl acrylate, vinyl acetate, vinyl butyrate, vinylidene chloride, vinyl chloride, vinyl bromide, acrylonitrile, methacrylonitrile, vinyl benzoate, allyl chloride, allyl acetate, allyl benzoate, vinyl laurate, vinyl stearate, vinyl methyl succinate, allyl butyl phthalate, divinyl succinate, diallyl phthalate, crotyl amyl phthalate, diallyl isophthalate, diallyl terephthalate, ethylene glycol diacrylate, vinyl ethyl ether, vinyl butyl ether, vinyl butyl ketone, allyl amine, vinyl pyrrolidone, vinyl pyridine, acrylamide, N-ethyl acrylamide, and the like, and mixtures thereof with the above-noted monomers.

Especially preferred polymers include the homopolymers and copolymers of monomers having a single ethylenic group, and preferably a single

group, and especially the alpha-olefins, such as ethylene, propylene, isobutylene and the like, and their copolymers and interpolymers.

The above-described polymers of the unsaturated monomers can be prepared by conventional techniques including the aqueous emulsion, suspension, solvent or bulk systems using catalyst systems such as free radical catalysts, Ziegler catalysts and the like. The superior properties and results are most in evidence, however, when one utilizes the highly crystalline polymers obtained by the use of the so-called Ziegler catalysts. These catalysts consist broadly of two-component systems comprising a compound of Groups 4b, 5b, 6b or 8 of the Periodic Table of the Elements, as illustrated on pages 448 and 449, Handbook of Chemistry and Physics, The Chemical Rubber Publishing Corp., 44th Edition, 1962, and a Group 1a, 2a or 3a element or alloy or hydride or organic derivative having an organometallic bond. Suitable catalysts are described in the reference listed on pages 350 to 361 of "Linear and Stereoregular Addition Polymer," by Gaylord and Mark, Interscience Publishers, Inc., New York (1959). Since stereoregular polypropylenes are now well known materials of commerce, their preparation need not be further detailed here. The common stereoregular form of the polyolefins is that known as isotactic.

Following conventional terminology, reference to "crystalline" or "isotactic" polymers means, unless the context indicates otherwise, solid polymers having a high degree of crystallinity or isotacticity, usually at least 50%, as determined by X-ray analysis or comparable methods. In general, polymers of olefins, such as propylene, having a crystallinity of this order contains at most only a very small proportion of atactic material which is extractable in hydrocarbons such as gasoline boiling range hydrocarbons. Typically, the proportion of highly crystalline polypropylene which is extractable in boiling heptane or isooctane is less than 10% and usually less than 5%.

The molecular weight of the thermoplastic polymer employed may vary over a wide range. In general, it is preferred to have polymers of high molecular weight, e.g., polymers of molecular weights (as determined by the light scattering technique) varying from 100,000 to 2 to 3 million. Molecular weights are often referred to in terms of intrinsic viscosity. Preferred polymers are those having intrinsic viscosity (measured in "Decalin" at 150° C.) between 1.5 and 10 dl./g. or higher.

The thermoplastic polymer is employed in the process as solid finely divided particles. The particles may be individual particles or agglomerates of two or more particles sticking together. The individual particles are preferably between 0.5 to 10 microns in diameter. The average size for particles which are agglomerates of one or more particles sticking together is generally below about 1000 microns. Average size for the agglomerate particles varies from 0.5 micron to 1000 microns.

A great variety of different blowing agents may be used in the process of the invention. All, however, act as blowing agents by volatilization from the condensed state, and not be chemical decomposition. Preferred agents are the volatile liquid blowing agents. By volatile blowing agent is meant one which is normally a liquid or gas and which can be dissolved or dispersed in a polymer melt and volatilized therefrom under controlled conditions, and preferably below 320° F. Preferred agents have a boiling point below about 100° C., and preferably between 40° C. and 100° C. These materials may be ethers, hydrocarbon or substituted hydrocarbons or mixtures thereof. Examples of such materials include, among others, butane, pentane, isopentane, cyclopentane, heptane, petroleum ethers boiling within the above-noted range, benzene, dichlorodifluoromethane, dichlorotetrafluoroethane, trichlorofluoromethane, difluorochloroethane, and the like. It is permissible, and in some cases desirable, to use mixtures of the above agents, and preferably mixtures of hydrocarbons and mixtures of aliphatic hydrocarbons and normally liquid lower halogenated hydrocarbons. A preferred group of blowing agents are the alkanes containing from 4 to 11 carbon atoms per molecule. Lower paraffins, e.g., those of 4 to 5 carbon atoms per molecule, are very suitable for the use with polypropylene.

To be included with the polymer particles is a material known as a foam-nucleating agent. These materials tend to provide sites upon which the bubbles begin to grow thus resulting in a greater number of individual locations for the bubbles in the expanding thermoplastic material, superior products being obtained when there is a large number and uniformly distributed bubble sites. Examples of such materials include, among others, silicates, such as Cabosil which is a finely divided silica powder and bentonites. These solid nucleating agents are preferably finely divided with particle size of narrow or broad size distribution. Preferred particle size varies from about the same size as the polymer particles down to several orders (e.g., 1 to 2) of magnitude smaller than the polymer particles. Especially preferred particles have a size about .01 to 1 micron in size.

Other materials may also be included with the polymer particles, such as, for example, finely-divided pigments, finely-divided particles of asphaltic materials, plasticizers, dyes and the like, depending upon the intended use of the final product.

The addition of the above-described nucleating agent and/or other materials to the polymer particles may be accomplished at any point, such as during the manufacture of the polymer articles, prior to or during the operating of the present process.

The amount of the above-described components to be used in the process of the invention will vary over a wide range. The blowing agent generally makes up from about .1% to about 60% by weight of the thermoplastic polymer material. Preferably the volatile liquid blowing agents are employed in amounts varying from about .5% to 40% by weight of the thermoplastic material. The amount of the nucleating agent will preferably vary from about .01% to 5% by weight of the polymer, and more preferably from 0.1% to 3% by weight of the thermoplastic material.

In the operation of the process, the finely divided thermoplastic polymer particles are placed in the hopper and the pressure reduced and the temperature raised and the blowing agent introduced and mixed with the polymer particles where a portion of the blowing agent is condensed on the particle surface. This part of the process is preferably accomplished by placing the polymer particles in a mixing hopper where they are heated to a temperature considerably below their melting point. with the typical thermoplastic polymers, and preferably the alpha-olefin polymers, this temperature generally ranges from about 75° F. to about 150° F. The pressure in the hopper is then reduced. The polymer particles are stirred and the volatile blowing agent (stored in a separate container) is then allowed to boil over into the hopper containing the stirred polymer particles. After the correct amount of blowing agent has been introduced, the stirring is continued say for from about 30 minutes to 12 hours to allow the mixture to equilibrate, i.e., to effect an even distribution of the blowing agent on the polymer particles.

The second part of the process is to form a melt of the above mixture while maintaining conditions such that the blowing agent remains in intimate contact with the thermoplastic material. This is preferably accomplished by applying nitrogen pressure to the above mixture and then by forcing it by means of a crammer into an extruder where it becomes heated to the desired temperature. The nitrogen pressure sufficient to keep the blowing agent in contact with the particles during the melting should preferably be at least equal to the vapor pressure of blowing agent at the temperature of extrusion for instance, with isopentane and polypropylene 430 p.s.i. to 480 p.s.i. Some nitrogen enters and passes through the extruder with the mixture. The temperatures employed in this part of the process should be at least sufficient to melt and fuse, i.e., to soften to a flowable condition, the desired thermoplastic polymer particles. The exact temperature employed will vary with the individual polymers, but in general will vary from about 275° F. to about 400° F. In the case of the olefin polymers, it is generally preferred to employ a temperature of about 300° F. to 330° F. at the inlet end of the extruder and a temperature of about 345° F. to 365° F. at the outlet end of the extruder.

The melt obtained by the above-described process has surprisingly uniform composition in that the blowing agent has been uniformly distributed throughout the melt. The melt is thus quite different in composition from the conventional melts obtained by introduction of the blowing agent directly into the melted polymer. In this case, it is difficult if not impossible to attain the same degree of mixing of the blowing agent in the polymer melt without degrading the polymer severely. As used herein melt "dispersion" is meant to include true solutions as well as actual dispersions.

The above-described uniform melt can be used to form superior foamed products having the desired cell size and cell size distribution. Important in obtaining a product of desired cell structure is the amount and type of blowing agent selected, the temperature of the melt and the rate of pressure release.

In forming a cellular product from the above-described melt prepared by the process of the invention, one cools the melt to a temperature just above the crystallization point of the thermoplastic polymer while still maintaining pressure sufficient to prevent volatilization of the blowing agent, and then effecting formation of the foamed product by forcing the material through the desired orifice thereby releasing the pressure.

The temperature employed at the entrance to the orifice will vary depending on the nature of the thermoplastic polymer material as each has its own crystallization point. In general, the exact temperature to which the melt is cooled will vary with amount and type of blowing agent. In the case of olefin polymers, such as polypropylene, the cooling temperature should preferably be between 280° F. and 315° F. at the die immediately prior to foaming.

The pressure employed at this stage should be sufficient to effect a pressure drop across the orifice or die and preferably one of at least 300 p.s.i. so as to prevent foaming upstream of the die. The exact pressure depends on amount and type of blowing agent, type of polymer and final temperature of the polymer. The pressure drop can be controlled by increasing the land length of die, by putting in restrictions, increasing the flow rate, decreasing the die area and the like.

The die or orifice employed must possess a specific geometry and size depending upon the nature of the product desired, e.g., such as bubble size and gross shape. The orifice may be, for example, a thin slit or annulus so as to form sheet material or as small round aperture to form tubular material, etc. A few routine runs will help demonstrate the best type and construction of die to be employed.

The equipment used in effecting the process of the invention may be of any desired design as long as it accomplishes the above-noted steps. A preferred assembly of apparatus comprises a combination of pressurized mixing hopper, pressurized single stage screw-type extruder with a sealed screw shaft, heat exchanger which is preferably internally finned, and a die. A diagrammatic sketch of such an assembly of apparatus is shown in the attached drawing.

Mixing hopper 1 is equipped with heating jacket 2, stirrer 3, cramming screw 4 for feeding powder to the extruder 5, and inlet for the blowing agent 6 and outlet at the bottom 7 for introduction of the mixture of polymer particles, nucleating agent, and blowing agent into the extruder. Extruder 5 equipped with heater means, a feed opening 8 and discharge opening 9, a single stage screw 10 with the extruder drive 11 separated from the chamber by a shaft seal 12 which prevents leakage of blowing agent from extruder. Attached to the discharge end of the extruder is heat exchanger 13 which preferably has internal fins for increased heat transfer area and has a jacketed casing 14 for cooling. The fins 15 in the heat exchange may be of any design, such as spiral or straight, as long as it accomplishes the purpose of increased heat transfer area. At the end of the heat exchanger is a back pressure valve 16 which is joined to the die 17.

The utilization of the above-described apparatus in operating the process of the invention is illustrated below relative to the formation of cellular products from polypropylene. Finely divided powdered polypropylene having a particle size (agglomerates) of less than 600 microns is mixed with say 0.1% to 3% by weight of a nucleating agent, such as Cab-O-Sil (a finely divided silica powder), and introduced into mixing hopper 1. The mixture is there heated to 60–150° F. and the mixing hopper evacuated to as low a pressure as possible. The blowing agent, such as isopentane, is then introduced at inlet 6, and the combined mixture stirred to effect thorough mixing of the blowing agent with the polymer particles during addition of the blowing agent. The vessel is then pressurized with nitrogen (e.g., 420–450 p.s.i.g.) and the extruder 5 started, the temperature in the extruder varying over the distance of the extruder from 320° F. at the feed or rear end to 370° F. at the discharge or front end. The mixture of blowing agent and particles is then forced into the extruder by the cramming screw 4 where it is formed into the desired homogeneous melt. Some of the nitrogen enters the extruder with the mixture and dissolves in the polymer melt in the extruder. It comes out of solution as the mixture is extruded and may thus provide some nucleation or blowing effect, but its volume is relatively small compared to the volume of volatile blowing agent. The pressure at the discharge end 9 of the extruder (entrance to heat exchanger) is 1400 p.s.i.g. to 1600 p.s.i.g. In the heat exchanger 13, the melt solution is cooled from 350° F. to a temperature of about 325° F. to 295° F. (which is just above crystallization point of the polypropylene). From the heat exchanger the melt passes through back pressure valve 16 where the pressure is reduced to about 1000 p.s.i. The melt is then forced through the die 17 where the pressure is released to atmospheric pressure and the desired cellular product is formed.

The process of the invention may be conducted in a batchwise, semi-continuous or continuous manner. While the above-described assembly of apparatus is more preferably suited for semi-continuous operation, one can effect a continuous operation by use of a polymer powder pump for injecting the mixture of polymer particles and nucleating agent into the pressurized hopper where the mixture is contacted and mixed with the blowing agent.

The process of the invention may also be conducted in combination with the polymerization phase wherein the polymer is formed in a volatile hydrocarbon medium, such as isopentane, and this mixture with the possible addition of nucleating agent is fed directly into the pressurized feed hopper of the extruder without prior recovery of the polymer particles from the polymerization reaction mixture.

The cellular product formed by the process of the invention is superior to conventional foamed products prepared by known methods in that the cells can be made with very much smaller diameter, more uniformity in size, and more uniform distribution throughout the product. The superiority as to cell size is demonstrated in Example I at the end of the specification. As noted above, this improvement in cell size and distribution makes the final product tougher and/or more flexible and thus permits the material to be used for a wider variety of different applications than the conventional cellular products.

The cellular products prepared by the above process are closed-cell products and preferably have a density varying from 0.8 lb./cu. ft. to 30 lbs./cu. ft., and cell size varying from 10μ to ¼-inch. The products are ideally suited for use in making foamed insulation material, cushions, pillows, sponges, package equipment, synthetic paper, boats, floats and other materials of construction.

To illustrate the manner in which the invention may be carried out, the following examples are given. It is to be understood, however, that the examples are for the purpose of illustration and the invention is not to be regarded as limited to any of the specific materials or conditions recited therein. Unless otherwise indicated, parts are parts by weight.

*Example I*

This example illustrates the operation of the process of the invention in making an improved cellular product from polypropylene and isopentane blowing agent, and the superiority of such a product as compared to that prepared by the conventional technique of adding the blowing agent directly to the melt.

(A) Crystalline polypropylene having an intrinsic viscosity of 2.3 dl./g. and agglomerate particle size of less than 600 microns was combined with 0.5% by weight of finely divided silica powder of about .01 to 1 micron in size (Cab-O-Sil) and the mixture placed in a mixing hopper as shown in the attached drawing. Here the particles were stirred and heated to 95° F. The hopper was then evacuated to 29 inches of vacuum and isopentane (10% by weight of the polypropylene) was boiled over into the hopper while stirring the polymer particles. The combined mixture was stirred for about 1 hour to effect an even distribution of the isopentane on the polypropylene particles. The stirrer and crammer 3, 4 rotation was reversed so as to cram powder into the extruder pre-heated and the mixture pressured with nitrogen at 445 p.s.i.g. The inlet of the extruder was at 320° F. and the outlet end was at 345–350° F. At this point, the nitrogen pressure maintained in the hopper kept the isopentane from escaping from the extruder through the feed port and kept it in intimate contact with the polymer particles as they melted and formed the uniform melt. Some nitrogen was dissolved in the melt. The melt was taken into the heat exchanger as shown in the drawing where it was cooled to about 310° F. Thence the melt went through the back pressure valve and into the die and out the orifice which was a single circular hole 0.073-inch in diameter. The pressure drop across the die was 900 pounds. The resulting product was a cellular polypropylene product of rod shape. The foam had a density of 2.7 lbs./cu. ft. and cell size below about 300 microns. The product was tough and had excellent flexibility.

(B) In a related experiment wherein the isopentane was introduced into the polypropylene after it had been melted, the resulting product had cells of various sizes with the smallest size being above about 800 microns. In addition, the product had poor physical properties, such as flexibility and toughness, as compared to the product in (A) above.

*Example II*

Example I is repeated with the exception that butane is used as the blowing agent. In this case, the resulting product is a uniform cellular product of similar properties.

*Example III*

Example I is repeated with the exception that the silica powder is replaced by talc. Related results are obtained.

*Example IV*

Example I is repeated with the exception that the polypropylene is replaced by polyethylene particles and the temperatures and pressures adjusted accordingly. Related results are obtained.

*Example V*

Example I is repeated with the exception that the isopentane is replaced by isooctane. Related results are obtained.

We claim as our invention:

1. A process for preparing a uniform melt dispersion of a thermoplastic polymer material and a compound which acts as blowing agent by volatilization from said melt dispersion, which melt dispersion can be used to form a foamed product having controlled cell size and size distribution, which comprises
    (1) mixing in a confined mixing zone a mass comprising essentially finely divided solid particles of said thermoplastic polymer with said blowing agent introduced into said mixing zone in vapor phase, said mixing taking place under conditions including a temperature substantially below the melt temperature of said polymer, said conditions being selected to cause said blowing agent in contact with the surfaces of said polymer particles to be deposited thereon and retained in condensed state;
    (2) continuing said mixing for a sufficient length of time to result in a substantially uniform distribution of said blowing agent in condensed state in said mass of particulate polymer;
    (3) applying inert gas pressure on said mixed mass of particulate polymer and blowing agent, sufficient to prevent escape of the blowing agent in the subsequent melting step; and
    (4) thereafter transferring said mixed mass under said inert gas pressure to a separate melting zone and heating said mass therein to a temperature above the melting point of said polymer, under sufficient pressure and agitation to continuously maintain the blowing agent in condensed state in intimate contact with the polymer.

2. A process for preparing foamed thermoplastic polymer products having a controlled cell size and size distribution, which comprises
   (1) mixing in a confined mixing zone a mass comprising essentially finely divided solid particles of a thermoplastic polymer with a compound which acts as blowing agent by volatilization, said blowing agent being introduced into said mixing zone in vapor phase, said mixing taking place under conditions including a temperature substantially below the melt temperature of said polymer, said conditions being selected to cause blowing agent in contact with the surfaces of said polymer particles to be deposited thereon and retained in condensed state;
   (2) continuing said mixing for a sufficient length of time to result in a substantially uniform distribution of said blowing agent in condensed state on the surfaces of said particles in said mass;
   (3) applying inert gas pressure on said mixed mass of particulate polymer and blowing agent, sufficient to prevent escape of the blowing agent in the subsequent melting step;
   (4) thereafter transferring said mixed mass under said inert gas pressure to a separate melting zone and heating said mass therein to a temperature above the melting point of said polymer, under sufficient pressure and agitation to continuously maintain said blowing agent and inert gas in the mixture in intimate contact with the polymer, and substantially uniformly distributed throughout the polymer mass;
   (5) thereafter cooling the mixture in a confined cooling zone to a temperature not substantially above the solidification temperature thereof and not sufficiently low to cause solidification, while under sufficient superatmospheric pressure to maintain said blowing agent in unvaporized condition; and
   (6) thereafter extruding the mixture of polymer, blowing agent and inert gas through a die into a zone of lower pressure and effecting formation of foam by volatilization of said blowing agent in the extruded mass.

3. A process as in claim 2 wherein the thermoplastic polymer is polypropylene.

4. A process as in claim 2 wherein the amount of the volatile blowing agent is in the range from about 0.5% to 60% by weight of the particles.

5. A process as in claim 2 wherein individual thermoplastic polymer particles in said mass have a size between about 0.5 to 10 microns and any agglomerates of such particles in said mass have a size below about 1000 microns.

6. A process as in claim 2 wherein the blowing agent is an alkane containing from 4 to 11 carbon atoms per molecule.

7. A process as in claim 2 wherein the blowing agent is butane.

8. A process as in claim 3 wherein the blowing agent is isopentane.

9. A process as in claim 2 wherein said mass comprises silica powder as foam-nucleating agent.

10. In the production of foamed thermoplastic polymer products having a controlled cell size and size distribution by extrusion, from a screw extruder, of a liquid mixture of said thermoplastic polymer and a compound which acts as blowing agent by volatilization, the improvement which comprises forcing into the feed port of said extruder a mass of finely divided solid particles of said thermoplastic polymer, having evenly distributed on said particles said blowing agent in condensed state, under sufficient inert gas pressure to prevent escape of the blowing agent through the feed port of said extruder.

11. A process for preparing foamed polypropylene products having a controlled cell size and size distribution, which comprises
   (1) mixing a mass comprising essentially finely divided solid polypropylene particles having a particle size in the range from 0.5 to 1,000 microns, initially at a temperature between 60° and 100° F., with a blowing agent which is a paraffin of from four to five carbon atoms per molecule, under initially reduced pressure and with agitation for a sufficient time to result in substantially uniform distribution of said blowing agent in said mass in condensed state on the surfaces of said polypropylene particles;
   (2) applying inert gas pressure on said mixed mass of polypropylene particles and blowing agent, at least equal to the vapor pressure of the blowing agent in the subsequent melting step;
   (3) forcing said mixed mass, while under inert gas pressure, into the feed section of a screw extruder;
   (4) compressing and forwarding said mixed mass in said extruder under conditions, including substantial superatmospheric pressure, adpted to melt the polymer while continuously maintaining said blowing agent and inert gas in the mixture in intimate contact with the polymer and substantially uniformly distributed throughout the polymer mass;
   (5) thereafter cooling the mixture to a temperature not substantially above the crystallization point of polypropylene and not sufficiently low to cause solidification, while under sufficient superatmospheric pressure to maintain said blowing agent in unvaporized condition; and
   (6) thereafter extruding the mixture of polymer, blowing agent and inert gas through a die into a zone of lower pressure and effecting formation of foam by volatilization of said blowing agent in the extruded mass at a temperature between 280° and 315° F.

12. A process as in claim 11 wherein the amount of the blowing agent is in the range from about 0.5% to 60% by weight of the polypropylene powder.

13. A process as in claim 1 wherein individual discrete polypropylene particles in said mass have a size between 0.5 and 10 microns and any agglomerates of such particles in said mass have a size less than about 20 mesh.

References Cited by the Examiner

UNITED STATES PATENTS

| 2,103,546 | 12/1937 | Morrel | 18—12 XR |
| 2,262,989 | 11/1941 | Conklin et al. | 18—12 XR |
| 2,443,289 | 6/1948 | Bailey | 18—12 |
| 2,523,137 | 9/1950 | Nichols et al. | 18—12 |
| 2,537,977 | 1/1951 | Dulmage | 264—53 |
| 2,783,498 | 3/1957 | Richardson | 18—12 |
| 2,836,851 | 6/1958 | Holt | 18—12 |
| 2,905,972 | 9/1959 | Aykanian et al. | 264—53 |
| 2,987,774 | 6/1961 | Jacobson | 264—53 |
| 3,102,865 | 9/1963 | Sneary et al. | 264—53 XR |
| 3,118,161 | 1/1964 | Cramton | 264—54 XR |
| 3,183,553 | 5/1965 | Slater | 18—12 |
| 3,188,295 | 6/1965 | Ballast et al. | 260—2.5 |

FOREIGN PATENTS

| 210,728 | 10/1957 | Australia. |
| 854,586 | 11/1960 | Great Britain. |
| 351,755 | 3/1961 | Switzerland. |

ALEXANDER H. BRODMERKEL, *Primary Examiner.*

P. E. ANDERSON, *Assistant Examiner.*